United States Patent
Novak

[11] 3,901,498
[45] Aug. 26, 1975

[54] MITER TABLE

[76] Inventor: Edward P. Novak, 911 Shenk Ave., Erie, Pa. 16505

[22] Filed: Mar. 11, 1974

[21] Appl. No.: 449,763

[52] U.S. Cl. .............. 269/81; 83/467; 83/471.3; 83/473; 83/477.2; 83/581; 269/304; 269/319
[51] Int. Cl.² .................... B27B 5/20; B23Q 1/04
[58] Field of Search ....... 83/467, 468, 471.2, 471.3, 83/473, 477, 477.2, 581; 269/315, 316, 317, 318, 319, 81, 304; 144/133 R, 133 A, 133 B, 136 R, 136 A, 136 B, 136 C, 136 D, 136 E, 136 F, 136 G, 136 H, 136 J

[56] References Cited
UNITED STATES PATENTS

| | | | |
|---|---|---|---|
| 2,260,421 | 10/1941 | Tracy | 83/468 |
| 2,680,458 | 6/1954 | Grammer | 83/471.2 |
| 2,895,515 | 7/1959 | Ende | 83/467 |
| 3,344,819 | 10/1967 | Mitchell | 83/467 |

Primary Examiner—J. M. Meister
Assistant Examiner—Fred A. Silverberg

[57] ABSTRACT

A miter table for use on a radial saw is disclosed. The miter table has a flat top surface with provision for supporting fence members in it. In one model, the miter table replaces the regular saw table and is fixed to the saw frame. In the other model, the miter table is pivoted to the regular saw table and clamped in position. It can be adjusted around the pivot to align it with the saw. There are holes formed in the table for receiving blocks fixed to the saw fences. These blocks snugly fit into the holes and hold the saw fences in place. One set of saw fences has arcuate supporting members that are received in a slot in the table top.

2 Claims, 13 Drawing Figures

PATENTED AUG 26 1975

3,901,498

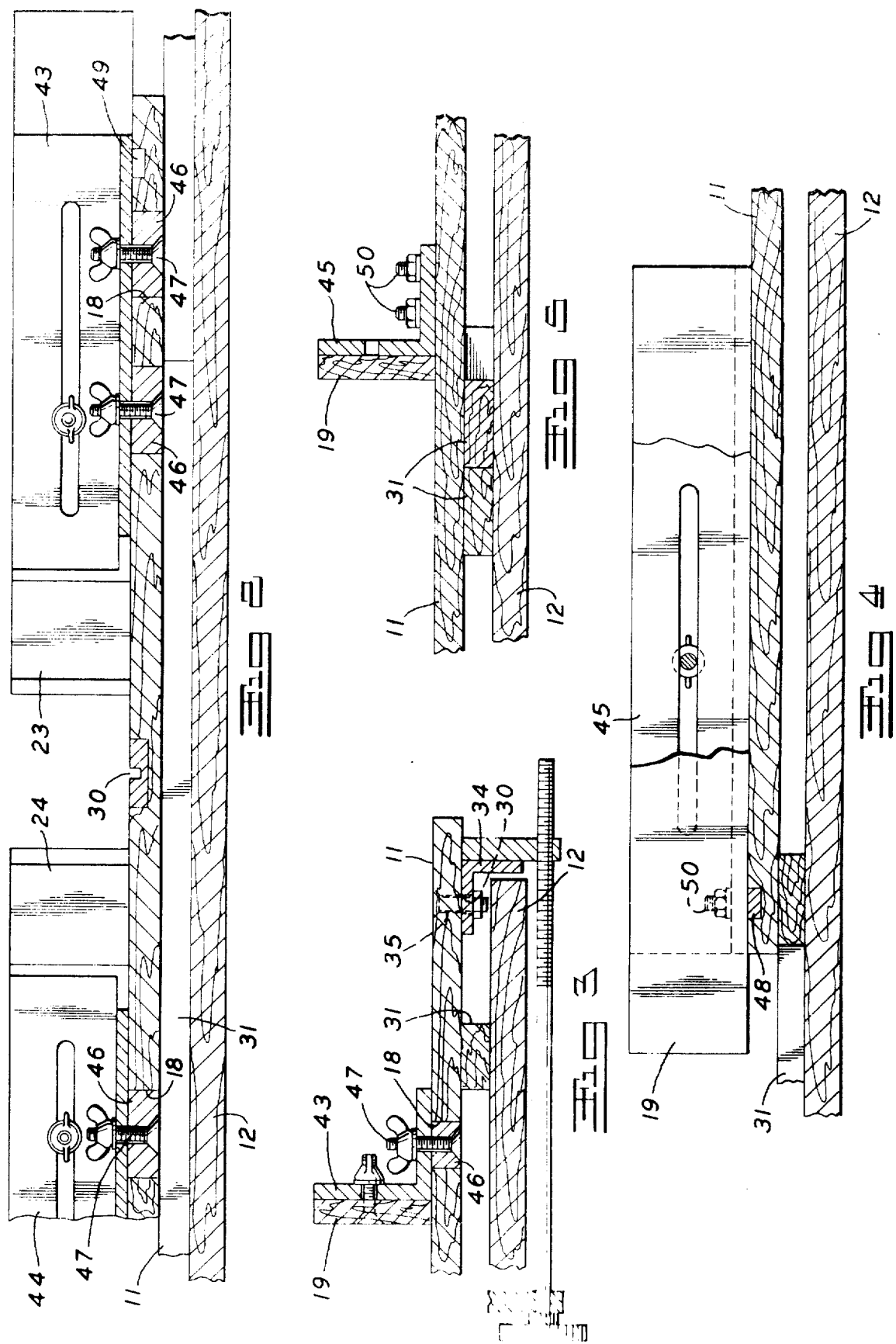

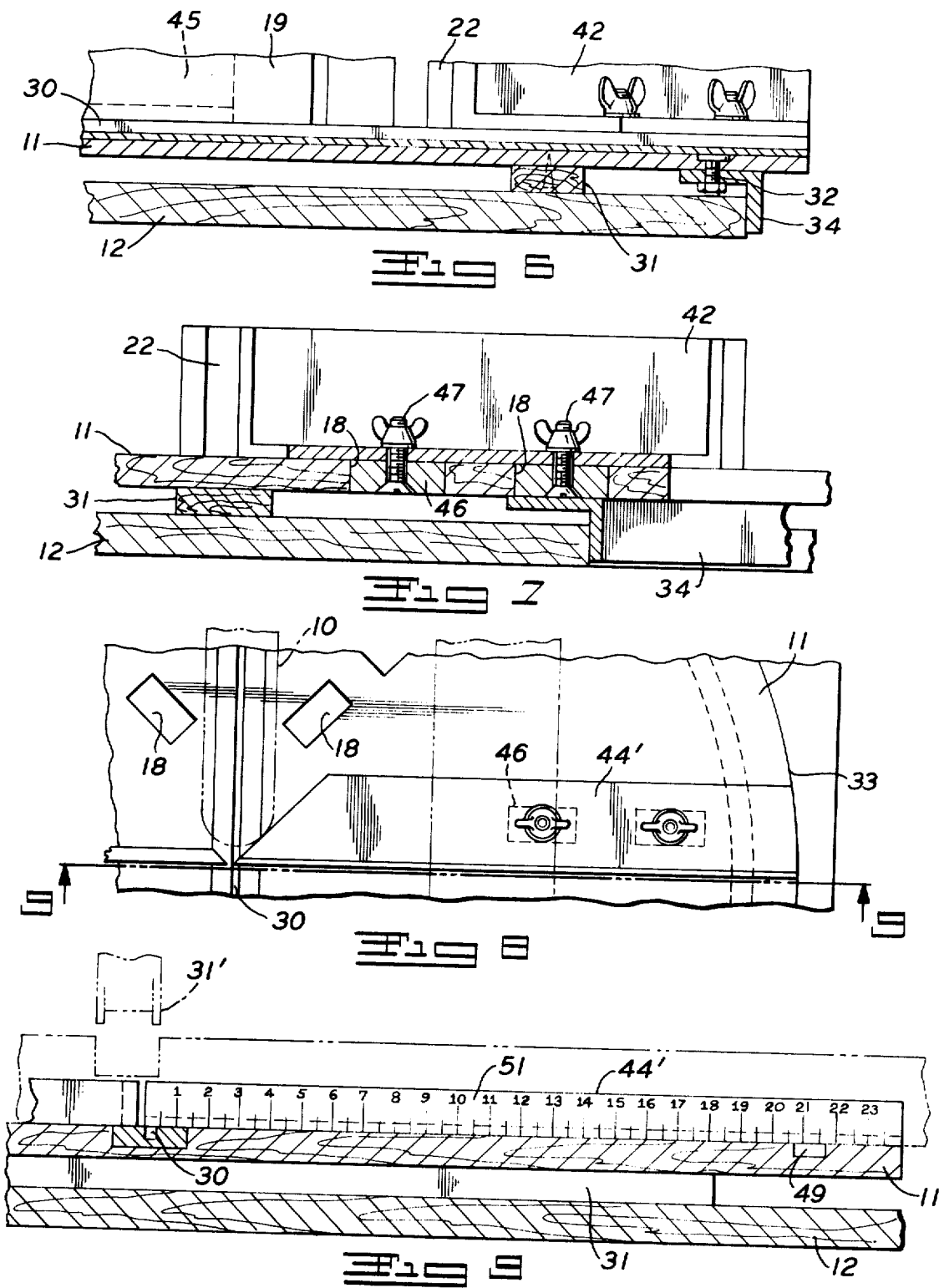

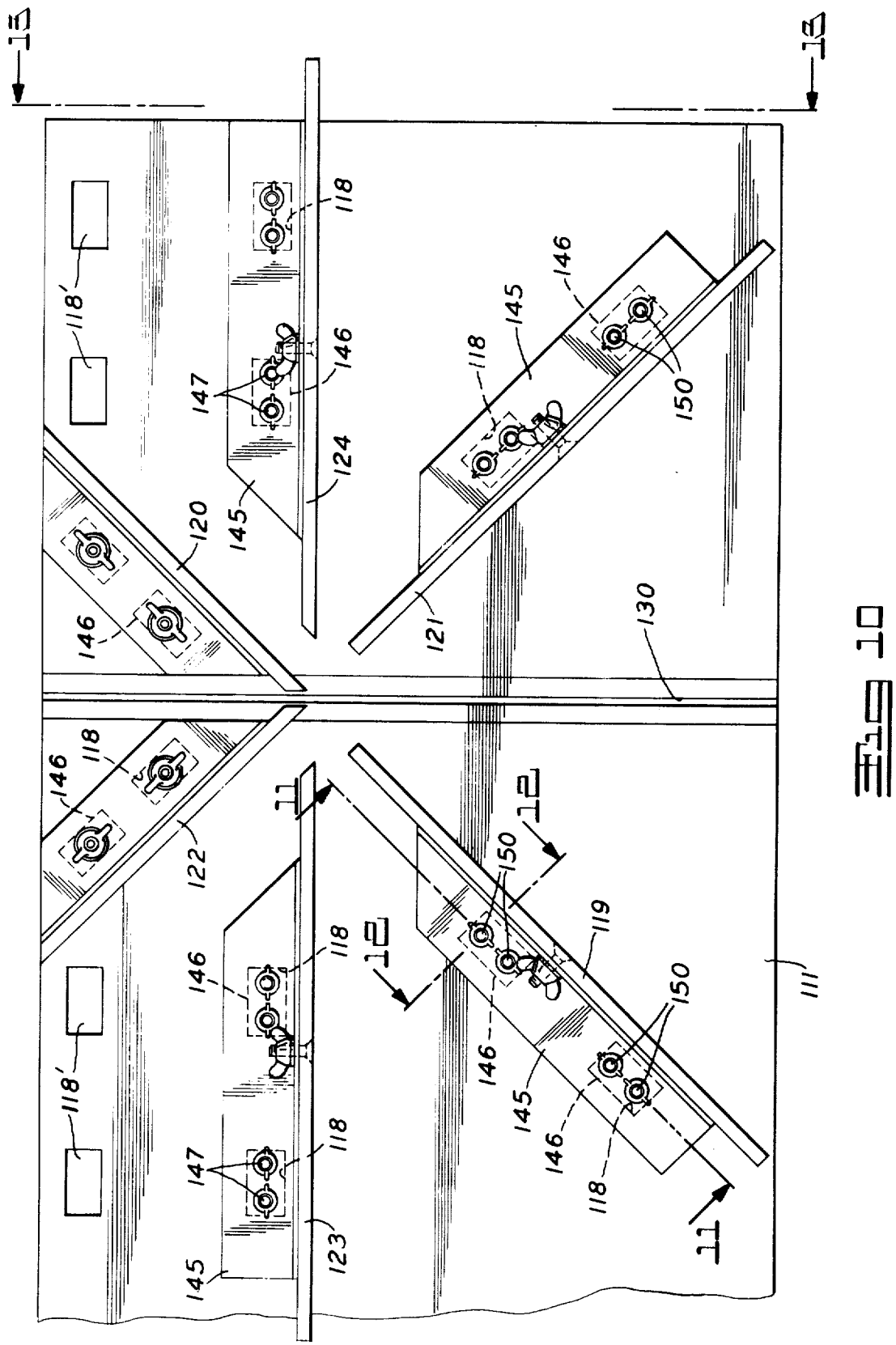

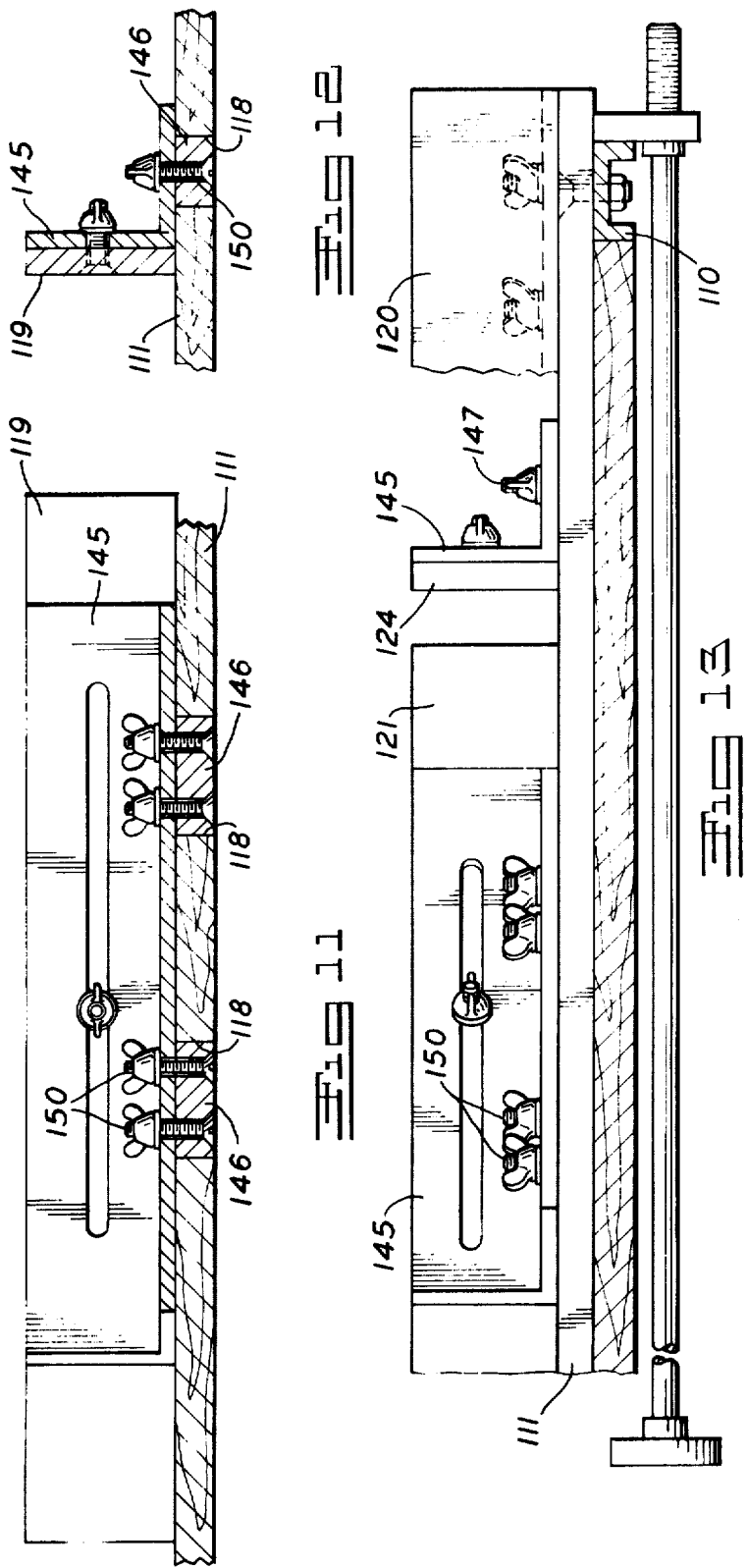

3,901,498

MITER TABLE

OBJECTS OF THE INVENTION

It is an object of the invention to provide an improved mitering attachment.

Another object of the invention is to provide an improved combination miter table and radial saw.

Another object of the invention is to provide an improved miter table and radial saw that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

The drawings generally show in FIG. 1, a top view of one embodiment of the table according to the invention, showing all fences in place so that the square cut or either miter cut can be made. Miter fences are set at 45° but could be set at any desired angle.

FIG. 2 shows a cross sectional view taken on line 2—2 of FIG. 1.

FIG. 3 shows a cross sectional view taken on line 3—3 of FIG. 1.

FIG. 4 shows a cross sectional view taken on line 4—4 of FIG. 1.

FIG. 5 shows a cross sectional view taken on line 5—5 of FIG. 1.

FIG. 6 shows a view taken on line 6—6 of FIG. 1.

FIG. 7 shows a cross sectional view taken on line 7—7 of FIG. 1.

FIG. 8 shows a partial top view of the saw and table.

FIG. 9 shows a cross sectional view taken on line 9—9 of FIG. 8.

FIG. 10 shows a top view of the second embodiment of the invention.

FIG. 11 shows a cross sectional view taken on line 11—11 of FIG. 10.

FIG. 12 shows a view taken on line 12—12 of FIG. 10.

FIG. 13 shows a view taken from the end at a line indicated as 13—13 of FIG. 10.

DETAILED DESCRIPTION OF THE DRAWINGS

Figure 1:
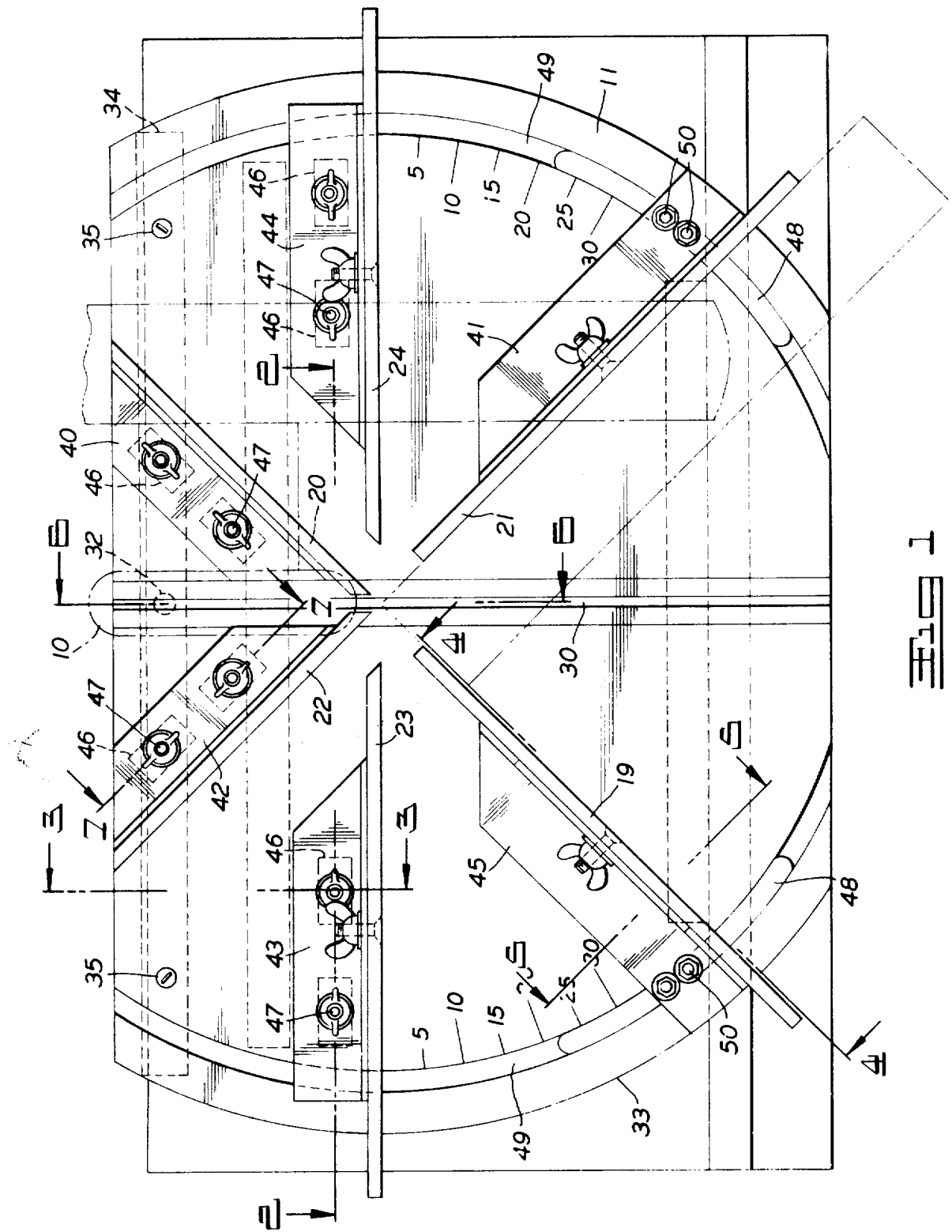

Now with more particular reference to the drawings, a miter saw indicated generally at 10 is shown. The saw has the usual saw blade which is reciprocally movable over the top of the table along the slot 30 formed in the table. Instead of a saw blade, the dado blade 31' could be used on the saw. The miter table 11 is supported above the saw table 12 a fixed distance by means of spacers 31. The miter table may be pivoted to the front of the saw table at 32. The miter table 11 has an outside, generally circular periphery 33 having angle members 34 clamped to the underside of the miter table 11 by means of flathead bolts 35 that have their nuts extend through the horizontal leg of the angle 34 and disposed in the space between the table 11 and the saw table 12. Thus, to square the table with the travel of the saw, the adjusting screws at the back of the table can be loosened and the table can be rotated about the pivot 32 and bolts 35 can then be tightened, clamping the table in this position.

The fence members 19 and 20 align with each other and the fence members 21 and 22 align with each other. The fence members 23 and 24 also align with each other. Each fence member has a platelike fence that is fixed to one of the angles 40, 41, 42, 43, 44 and 45 respectively. Each of the angles 40 through 45 have both a vertical leg and a horizontal leg. The vertical leg is fixed to the platelike fence by a suitable flat head screw with a wing nut and the horizontal leg in the case of fences 20, 22, 23, and 24 are fixed to blocks 46 which are held to the angles 40, 42, 43 and 44 by means of threaded bolts 47 having wing nuts. These blocks 46 snugly fit into holes 18 in the miter table.

The angles 41 and 45 are fixed to the arcuate members 48 that are slidably received in the slot 49 in the table 11. The arcuate members 48 are fixed to the angles 41 and 45 by means of bolts 50. A scale 51 can be fixed to angle 44', as shown in FIG. 8, or scribed on the angle itself.

To use the miter table shown in FIGS. 1-9, it is merely necessary to mount the miter table 11 on top of a regular saw table 12, secure the pivot 32, and clamp the angles 34 to the proper position on the sides of the saw table. The operator can then use the fences 23 and 24 to make square cuts and can adjust the position of the fences 19, 20, 21, and 22 to make angular cuts. If the saw is merely used for cut off work, all of the fences can be removed from the table. To make exact adjustments, the wing nuts that attach the inserts to the fence can be loosened.

The embodiment of the invention shown in FIGS. 10, 11, 12 and 13 shows a table 111 that may be supported above a machine 110, as shown in FIG. 13, to replace the regular table. The table 111 has square opening 118 in it, the holes may be round or any other shape, which may receive the blocks 146. Additional openings 118' are provided adjacent the read edge of the table and the fences 123 and 124 can be moved to these positions adjacent the rear edge of the table when angular cuts are not being made.

The fences 119 and 120 are supported on blocks 146 which are held to the angle 145 by suitable bolts having wing nuts. In each case, as in the embodiment of FIG. 1, the fences 119 and 120, 121 and 122, 123 and 124, are all fixed to angle irons 145. These angle irons 145 are fixed to the blocks 146 which are snugly received in the openings in the miter table. Thus when any particular fence is not being used, it can be taken off the table by removing it, together with its blocks 146, thereby clearing the table so that some other angular cut can be made.

The foregoing specification sets forth the invention in its preferred practical forms but the structure shown is capable of modification within a range of equivalents without departing from the invention which is to be understood is broadly novel as is commensurate with the appended claims.

I claim:

1. In combination, a radial saw and a miter table having a table top with a thickness, said saw being adapted to have a saw blade and adapted to have means to move said saw blade in reciprocatory path over said table comprising means supporting said table on said radial saw, fence means, support means for supporting said fence means on said miter table, said support means comprising fence members having a first flange adapted to rest on said miter table, and non-circular blocklite inserts substantially equal in thickness to the the thickness of said table fixed to the bottom of said flanges, and holes in said table adapted to snugly receive said blocklike inserts whereby said fences are removably supported on said table, and means pivotally supporting said miter table on said saw whereby the angular position of said fence on said miter table can be adjusted, and clamping means clamping said miter table in adjusted position on said radial saw.

2. The combination recited in claim 1 wherein said miter table has an arcuate slot adjacent its outer edge, arcuate means is fixed to said flange means extending into said slot whereby said fence means are fixed to said table top.

* * * * *